US011949615B2

(12) United States Patent
Pezeshki et al.

(10) Patent No.: US 11,949,615 B2
(45) Date of Patent: Apr. 2, 2024

(54) USER EQUIPMENT (UE) FEEDBACK OF QUANTIZED PER-PATH ANGLE OF ARRIVAL

(71) Applicant: QUALCOMM Incorporated, San Diego, CA (US)

(72) Inventors: Hamed Pezeshki, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 17/341,269

(22) Filed: Jun. 7, 2021

(65) Prior Publication Data

US 2021/0385040 A1 Dec. 9, 2021

Related U.S. Application Data

(60) Provisional application No. 63/036,336, filed on Jun. 8, 2020.

(51) Int. Cl.
*H04L 5/00* (2006.01)
*H04L 25/02* (2006.01)
*H04W 16/28* (2009.01)
*H04W 72/21* (2023.01)

(52) U.S. Cl.
CPC ........ *H04L 5/0048* (2013.01); *H04L 25/0228* (2013.01); *H04W 16/28* (2013.01); *H04W 72/21* (2023.01)

(58) Field of Classification Search
CPC ............... H04L 5/0048; H04L 25/0228; H04L 25/0254; H04W 16/28; H04W 72/0413
See application file for complete search history.

(56) References Cited

U.S. PATENT DOCUMENTS

| 2020/0302187 | A1* | 9/2020 | Wang | ............... | H04L 25/0224 |
| 2021/0367656 | A1* | 11/2021 | Huang | ............... | H04B 7/0626 |
| 2022/0158702 | A1* | 5/2022 | Nallampatti Ekambaram ........... H04W 64/003 |
| 2022/0321181 | A1* | 10/2022 | Hadani | ............... | H04B 7/0452 |

OTHER PUBLICATIONS

Uwaechia et al., "A Comprehensive Survey on Millimeter Wave Communications for Fifth-Generation Wireless Networks: Feasibility and Challenges", Mar. 30, 2022, IEEE (Year: 2022).*
Kangas et al., "Positioning in LTE", Wiley-IEEE Press 2019 (Year: 2019).*
Zhu et al., "Auxiliary Beam Pair Enabled AoD and AoA Estimation in Closed-Loop Large-Scale mmWave MIMO Systems", Dec. 22, 2016 (Year: 2016).*
Alevizos et al., "Limited Feedback Channel Estimation in Massive MIMO with Non-uniform Directional Dictionaries", Aug. 7, 2018, IEEE (Year: 2018).*

* cited by examiner

*Primary Examiner* — Justin T Van Roie
(74) *Attorney, Agent, or Firm* — Arun Swain

(57) ABSTRACT

A method of wireless communication by a user equipment (UE) comprises receiving, from a base station, multiple reference signals, and estimating a channel based on the received reference signals. The channel comprises multiple channel paths. The method also includes quantizing an angle of arrival (AoA) of each channel path into one of a group of quantization levels. The method further includes reporting to the base station the quantized angle of arrival, and also a delay and/or power level for the quantized angle of arrival.

30 Claims, 8 Drawing Sheets

USER EQUIPMENT (UE) FEEDBACK OF QUANTIZED PER-PATH ANGLE OF ARRIVAL

CROSS-REFERENCE TO RELATED APPLICATION

The present application claims the benefit of U.S. Provisional Patent Application No. 63/036,336, filed on Jun. 8, 2020, and titled "USER EQUIPMENT (UE) FEEDBACK OF QUANTIZED PER-PATH ANGLE OF ARRIVAL," the disclosure of which is expressly incorporated by reference in its entirety.

FIELD OF THE DISCLOSURE

Aspects of the present disclosure generally relate to wireless communications, and more particularly to techniques and apparatuses for user equipment (UE) feedback of directional information, such as quantized per-path angle of arrival (AoA) information.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a New Radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method of wireless communication by a user equipment (UE) includes receiving, from a base station, multiple reference signals. The method further includes estimating a channel based on the reference signals, the channel having multiple channel paths. The method further includes quantizing an angle of arrival (AoA) of each of the channel paths into a quantization level. The method still further includes reporting to the base station a quantized angle of arrival, and a delay and/or power level for the quantized angle of arrival.

Other aspects of the present disclosure are directed to an apparatus for wireless communications at a user equipment (UE) having one or more processors, memory coupled with the processor(s), and instructions stored in the memory. When the instructions are executed by the processor(s), the apparatus receives, from a base station, multiple reference signals. The apparatus also estimates a channel based on the reference signals, the channel having multiple channel paths. The apparatus further quantizes an angle of arrival (AoA) of each of channel paths into a quantization level. The apparatus further reports to the base station a quantized angle of arrival, and a delay and/or a power level for the quantized angle of arrival.

Other aspects of the present disclosure are directed to an apparatus of a user equipment (UE) for wireless communications including means for receiving, from a base station, multiple reference signals. The apparatus further includes means for estimating a channel based on the reference signals, the channel having multiple channel paths. The apparatus still further includes means for quantizing an angle of arrival (AoA) of each of the channel paths into one of a multiple quantization levels. The apparatus still further includes means for reporting to the base station a quantized angle of arrival, and one or more delay or power level for the quantized angle of arrival.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
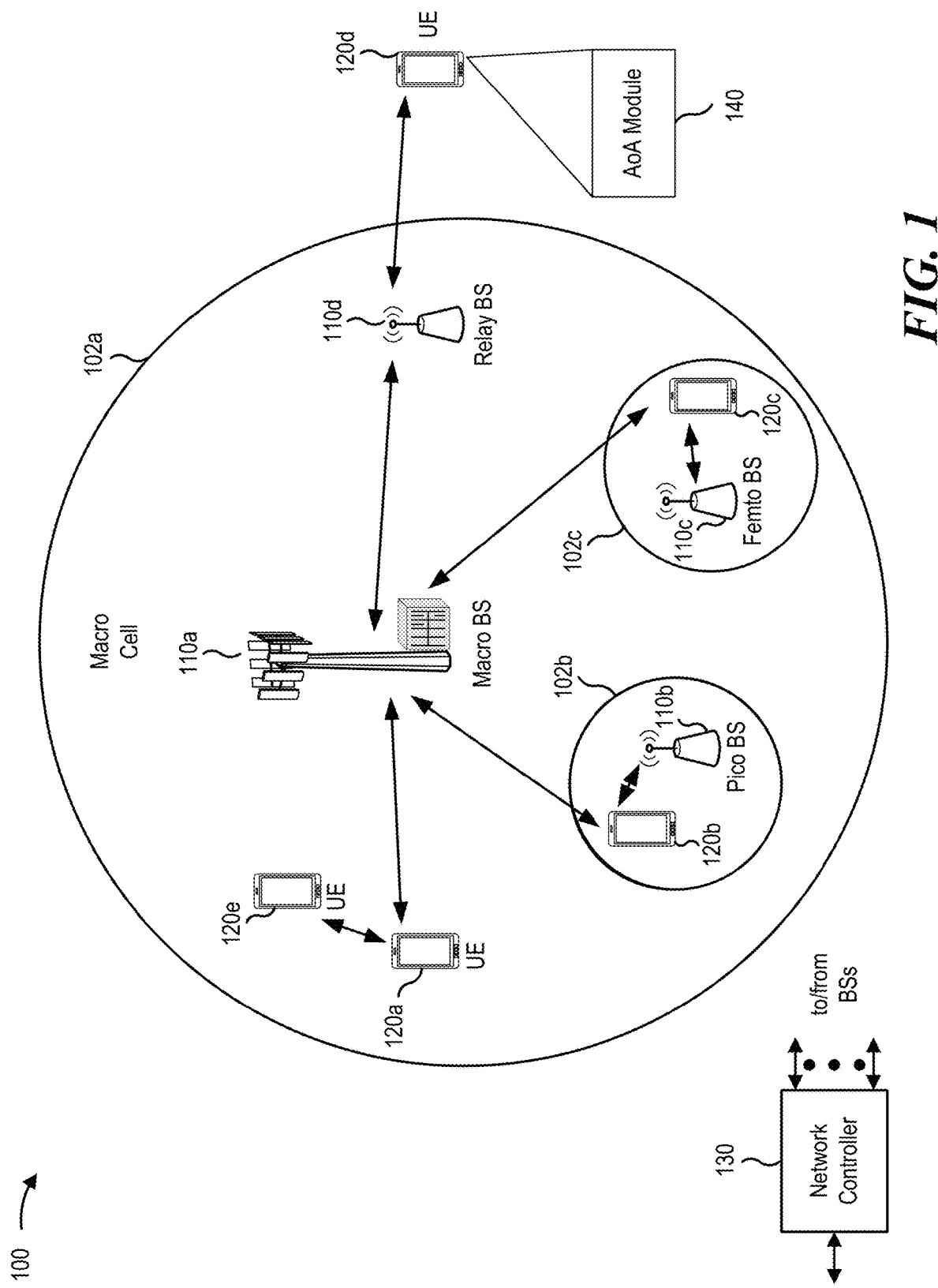
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Current FR2 (frequency range two, millimeter wave (mmWave)) 5G NR (new radio) systems leverage the small wavelengths of mmWave at higher frequencies to make use of massive multiple input multiple output (MIMO) antenna arrays to create highly directional beams that focus transmitted radio frequency (RF) energy in order to attempt to overcome propagation and path loss challenges in uplink and downlink paths. In some implementations, a base station may transmit multiple directional candidate beams towards a desired UE for communication. In turn, the UE may measure characteristics, such as angle of arrival, of each channel per-path. The UE may report the angle of arrival information to the base station for beam management, beam training, etc.

Although the present description is primarily with respect to mmWave communications, the disclosure is not so limited. For example, the concepts described are equally applicable to other technologies, such as frequency range one (FR1, sub-6 GHz) massive MIMO (multiple input multiple output) technology. It has been established that a correlation exists between angle of arrival for dominant channel paths in FR1 versus FR2. Aspects of the present disclosure enable estimating angle of arrival for FR1 and then predicting angle of arrival for dominant channel paths in FR2. In fact, the concepts described are applicable in any system with a large number of antennas, not just FR1 and FR2.

Measuring per-path angle of arrival at the UE is a challenging problem for multiple reasons. For example, a number of antenna elements at the UE is lower compared to the base station. The lower number translates into lower angular resolution. Moreover, existing procedures for angle of arrival measurement demand high processing power. Even assuming an accurate angle of arrival measurement, large overhead is specified for per-path angle of arrival feedback, especially with fine resolution measurements.

Aspects of the present disclosure allow the UE to feedback quantized per-path angle of arrival (AoA) values to the base station together with delay and/or power level(s) for quantized angle of arrival levels. A number of quantization levels may depend on the number of antenna elements on the UE antenna array. More antennas generally translate into higher angular resolution and hence more angular levels or bins.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110.

The UEs 120 may include an AoA module 140. For brevity, only one UE 120d is shown as including the AoA module 140. The AoA module 140 may receive, from a base station, multiple reference signals. The AoA module 140 may also estimate a channel based on the reference signals, the channel having multiple channel paths. The AoA module 140 may quantize an angle of arrival (AoA) of each channel path into a quantization level, and report to the base station a quantized angle of arrival, and delay and/or a power level for the quantized angle of arrival.

As indicated above, FIG. 1 is provided merely as an example. Other examples may differ from what is described with regard to FIG. 1.

Figure 2:
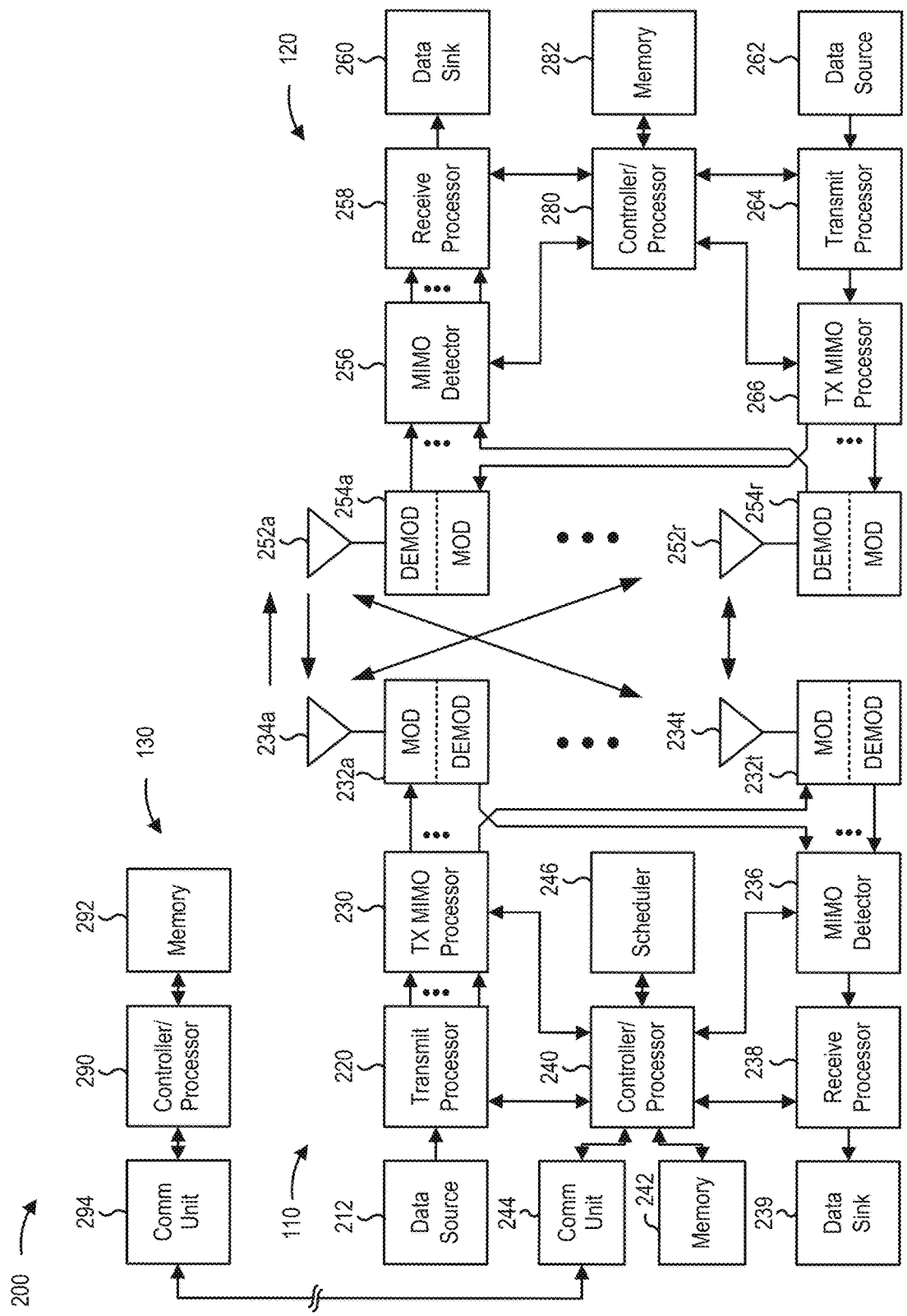
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 280 of the UE 120, and/or any other component(s) of FIG. 2 may perform one or more techniques associated with quantized angle of arrival feedback, as described in more detail elsewhere. For example, the controller/processor 280 of the UE 120, and/or any other component(s) of FIG. 2 may perform or direct operations of, for example, the processes of FIG. 7 and/or other processes as described. Memory 282 may store data and program codes for the UE 120. A scheduler 246 may schedule UEs for data transmission on the downlink and/or uplink.

In some aspects, the UE 120 may include means for receiving, means for estimating, means for quantizing, means for reporting, and/or means for transmitting. Such means may include one or more components of the UE 120 described in connection with FIG. 2.

As indicated above, FIG. 2 is provided merely as an example. Other examples may differ from what is described with regard to FIG. 2.

Figure 3:
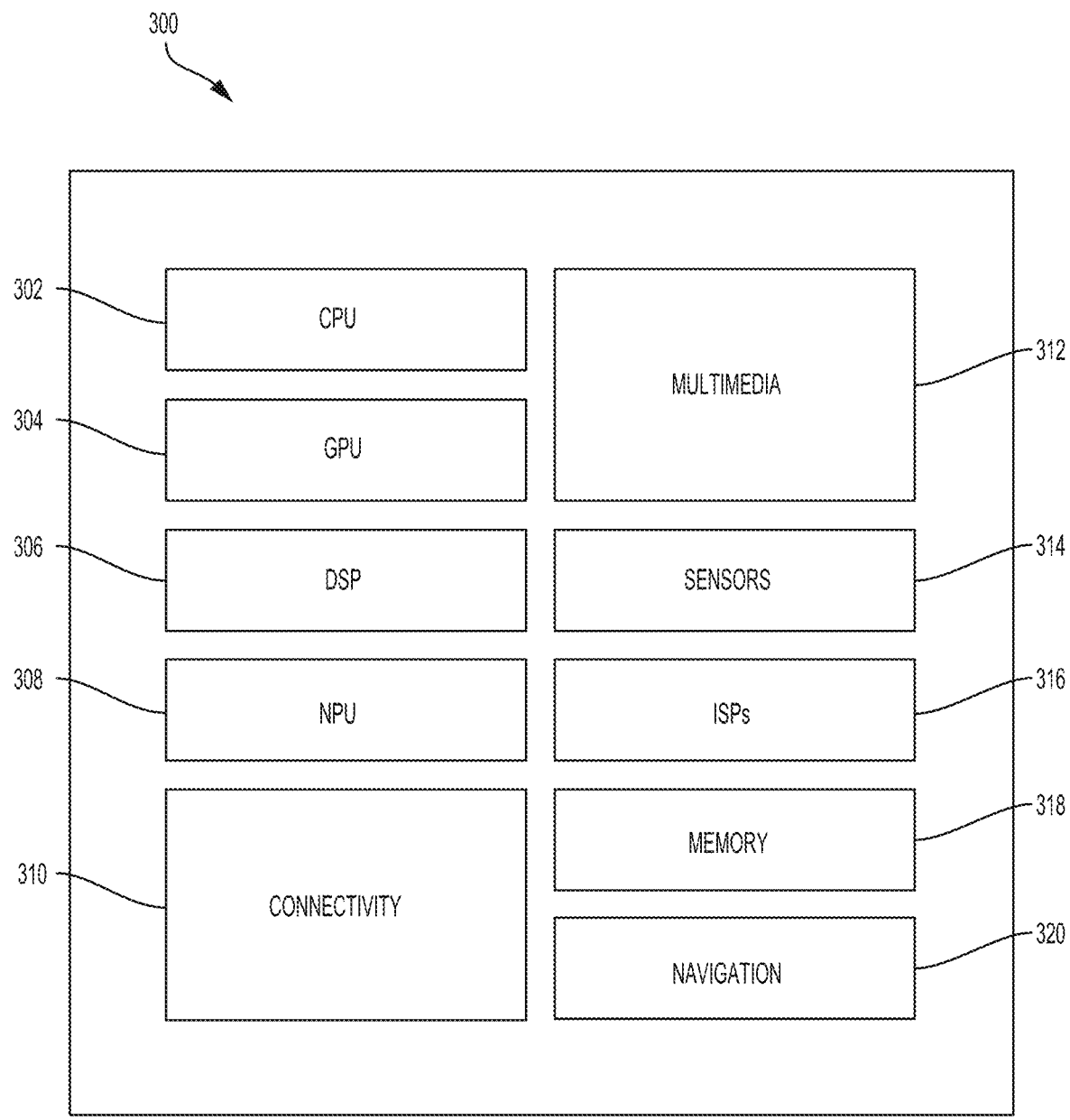
FIG. 3 illustrates an example implementation of a neural network using a system-on-a-chip (SoC), including a central processing unit (CPU), in accordance with some aspects of the present disclosure.

FIG. 3 illustrates an example implementation of a neural network using a system-on-a-chip (SoC) 300, including a central processing unit (CPU) 302, in accordance with some aspects of the present disclosure. The CPU 302, or a multi-core CPU, of the SoC 300 is configured for quantizing angles of arrival for paths received at a UE, in accordance with some aspects of the present disclosure. The SoC 300 may be included in the base station 110, dedicated transceiver 150, or UE 120. Variables (for example, neural signals and synaptic weights), system parameters associated with a computational device (for example, neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SoC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In some implementations, the NPU is implemented in the CPU, DSP, or GPU. The SoC 300 may also include a sensor processor 314, image signal processors (ISPs) 316, or navigation module 320, which may include a global positioning system.

The SoC 300 may be based on an ARM instruction set. In some aspects of the present disclosure, the instructions loaded into the general-purpose processor 302 may comprise code to receive reference signals from a base station and code to estimate a channel based on the reference signals.

The instructions may also comprise code to quantize an angle of arrival of each channel path into a quantization level. The instructions may further comprise code to report a quantized angle of arrival and also a delay and/or power level for the quantized angle of arrival.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
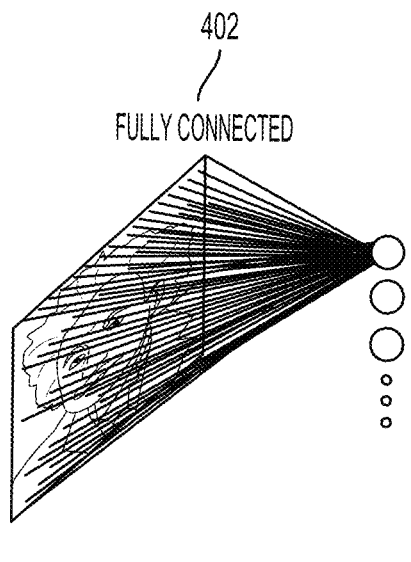
FIG. 4A is a diagram illustrating an example of a neural network, in accordance with some aspects of the present disclosure.
Figure 4B:
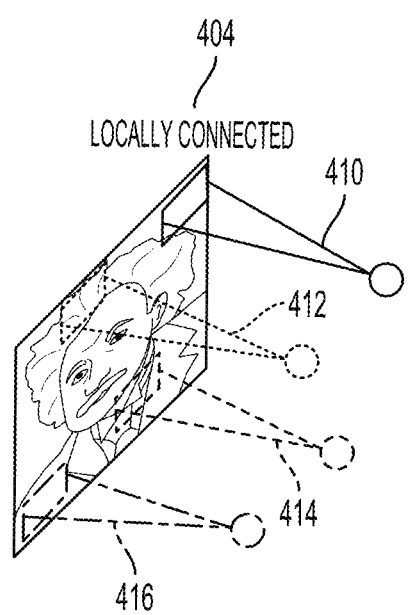
FIG. 4B is a diagram illustrating an example of a neural network, in accordance with some aspects of the present disclosure.

The connections between layers of a neural network may be fully connected or locally connected. FIG. 4A is a diagram illustrating an example of a neural network 402, in accordance with some aspects of the present disclosure. The neural network 402 is an example of a fully connected neural network 402. In a fully connected neural network 402, a neuron in a first layer may communicate its output to every neuron in a second layer, so that each neuron in the second layer will receive input from every neuron in the first layer. FIG. 4B is a diagram illustrating an example of a neural network 404, in accordance with some aspects of the present disclosure. The neural network 404 of FIG. 4B is an example of a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (for example, 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
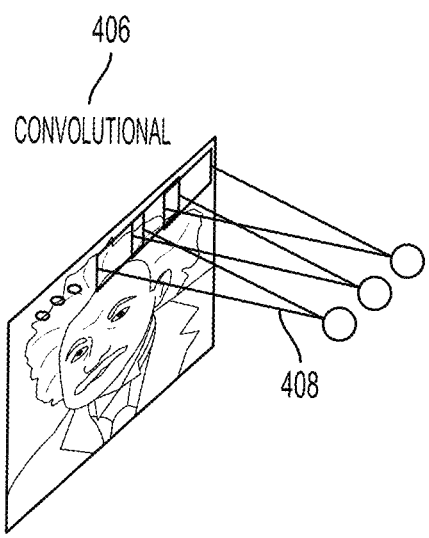
FIG. 4C is a diagram illustrating an example of a neural network, in accordance with some aspects of the present disclosure.

One example of a locally connected neural network is a convolutional neural network. FIG. 4C is a diagram illustrating an example of a neural network 406, in accordance with some aspects of the present disclosure. The neural network 406 of FIG. 4C is an example of a convolutional neural network 406. The convolutional neural network 406 may be configured such that the connection strengths associated with the inputs for each neuron in the second layer are shared (for example, 408). Convolutional neural networks may be well suited to problems in which the spatial location of inputs is meaningful.

Figure 4D:
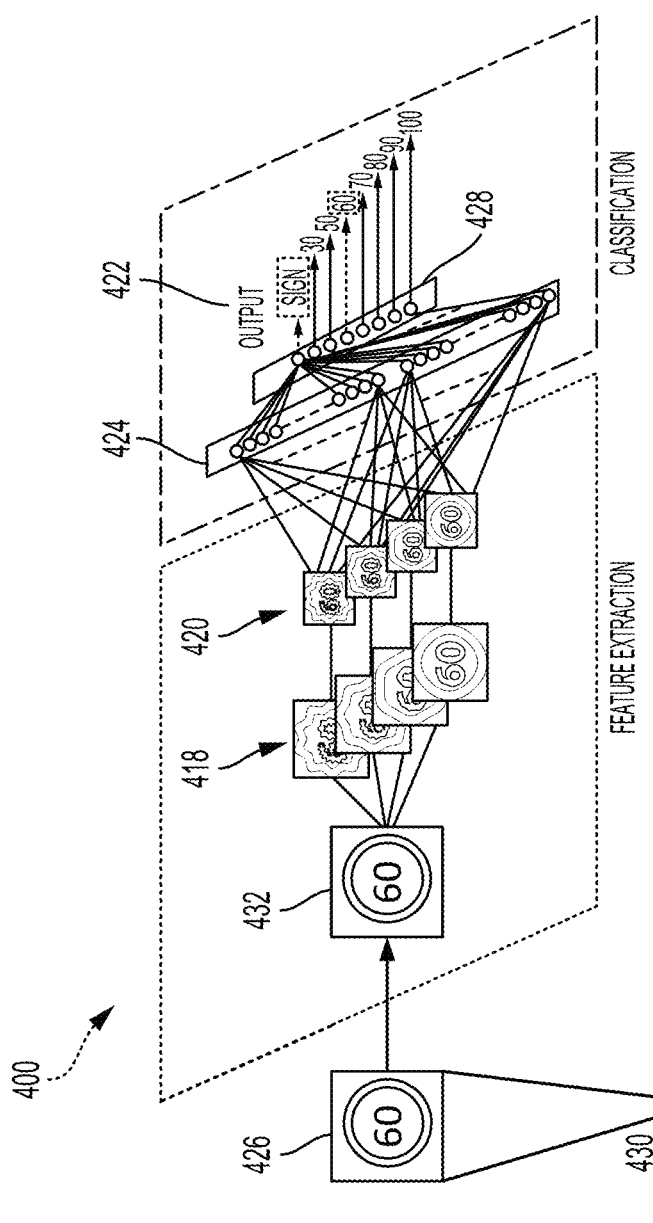
FIG. 4D is a diagram illustrating an example of a deep convolutional network (DCN), in accordance with aspects of the present disclosure.

One type of convolutional neural network is a deep convolutional network (DCN). FIG. 4D is a diagram illustrating an example of a neural network 400 in accordance with some aspects of the present disclosure. The neural network 400 of FIG. 4D is an example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426, such as "sign" and "60." The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (for example, the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (for example, 220) receiving input from a range of neurons in the previous layer (for example, feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
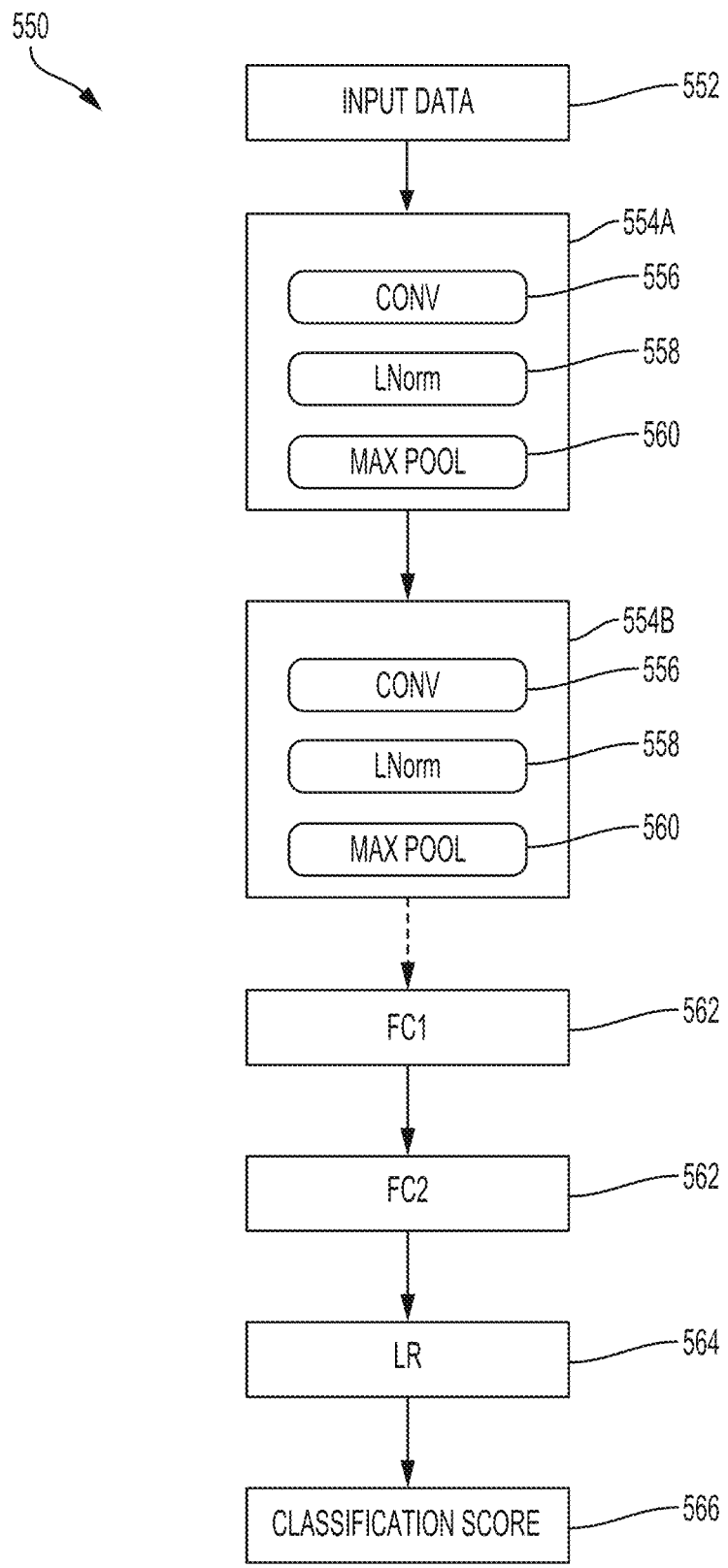
FIG. 5 is a block diagram illustrating an example of a DCN, in accordance with aspects of the present disclosure.

FIG. 5 is a block diagram illustrating an example of a DCN 550, in accordance with aspects of the present disclosure. The DCN 550 may include multiple different types of layers based on connectivity and weight sharing. As shown in FIG. 5, the DCN 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the DCN 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SoC 300 to achieve high performance and low power consumption. In some examples, the parallel filter banks may be loaded on the DSP 306 or an ISP 316 of an SoC 300. In addition, the DCN 550 may access other processing blocks that may be present on the SoC 300, such as sensor processor 314 and navigation module 320, dedicated, respectively, to sensors and navigation.

The DCN 550 may also include one or more fully connected layers 562 (FC1 and FC2). The DCN 550 may further include a logistic regression (LR) layer 564. Between each layer 556, 558, 560, 562, 564 of the DCN 550 are weights (not shown) that are to be updated. The output of each of the layers (for example, 556, 558, 560, 562, and 564) may serve as an input of a succeeding one of the layers (for example, 556, 558, 560, 562, and 564) in the DCN 550 to learn hierarchical feature representations from input data 552 (for example, images, audio, video, sensor data or other input data) supplied at the first of the convolution blocks 554A. The output of the DCN 550 is a classification score 566 for the input data 552. The classification score 566 may be a set of probabilities, where each probability is the probability of the input data, including a feature from a set of features.

One aspect of 5G NR communications technology includes the use of high-frequency spectrum bands above 24 GHz, which may be referred to as millimeter wave (mmWave). The use of these bands enables high data rates and increases in data processing capacity. However, mmWave bands are susceptible to rapid channel variations and suffer from free-space path loss and atmospheric absorption. In addition, mmWave bands are vulnerable to blockage (e.g., hand, head, body, foliage, and building penetration). Particularly, at mmWave frequencies, even small variations in the environment, such as a turn of the head, movement of the hand, or a passing car, can change the channel conditions between the base station and the UE, and thus impact communication performance.

Current mmWave 5G NR systems leverage the small wavelengths of mmWave at the higher frequencies to make use of massive multiple input multiple output (MIMO) antenna arrays to create highly directional beams. The highly directional beams focus transmitted radio frequency (RF) energy in order to attempt to overcome propagation and path loss challenges in the uplink and downlink paths. In some implementations, a base station may transmit multiple directional candidate beams towards a desired UE for communication. In turn, the UE may measure characteristics, such as angle of arrival, of each channel per-path. The UE can report the angle of arrival information to the base station for beam management, beam training, etc. The information on directionality may improve efficiency of beam management and beam training processes.

Consider a geometric channel model with L scatterers for a MIMO channel H between a base station and UE, assuming downlink transmission from the base station to the UE. Each scatterer is assumed to contribute a single propagation path between the base station and UE. Under this model the channel H can be expressed as $$H = \sqrt{\frac{N_{BS}N_{UE}}{\rho}} \sum_{l=1}^{L} \alpha_l a_{UE}(\theta_l) a_{BS}^H(\gamma_l),$$

where $\rho$ denotes the average path-loss between the base station and UE, $N_{BS}$ and $N_{UE}$ represent the number of antennas at the base station and UE sides, respectively, and $\alpha_l$ is the complex gain of the $l^{th}$ path. The variables $\theta_l$ and $\gamma_l$ are the path's angles of arrival or departure (AoAs/AoDs) of the UE and base station, respectively. Please note that $\theta_l$ may represent azimuth and/or elevation angles of arrival and similarly $\gamma_l$ may represent azimuth and/or elevation angles of departure. Finally, $a_{UE}(\theta_l)$ and $a_{BS}^H(\gamma_l)$ are the antenna array response vectors at the UE and base station, respectively.

Measuring per-path angle of arrival at the UE is a challenging problem for multiple reasons. For example, a number of antenna elements at the UE is lower compared to a number of antenna elements at the base station, which may have 128 or 256 antenna elements. The lower number translates into lower angular resolution. Moreover, existing algorithms for angle of arrival measurement, such as the estimation of signal parameters via rotational invariance technique (ESPRIT) or the multiple signal classification (MUSIC) technique, demand high processing power. Even assuming accurate angle of arrival measurement, large overhead is specified for per-path angle of arrival feedback, especially with fine resolution measurements.

Aspects of the present disclosure provide techniques to improve reliability and robustness for mmWave systems in 5G NR communications technology by allowing the UE to feedback quantized per-path angle of arrival (AoA) values to the base station together with delay and/or power level information for quantized angle of arrival levels. In other words, an incident angle on an antenna panel is determined and reported. By knowing the angle of arrival information about each channel path, a channel may be better identified. A number of quantization levels may depend at least on the number of antenna elements on the UE antenna array. More antennas generally translate into higher angular resolution and hence more angular levels or bins. In some aspects, the quantization levels may be referred to as sectors.

Figure 6:
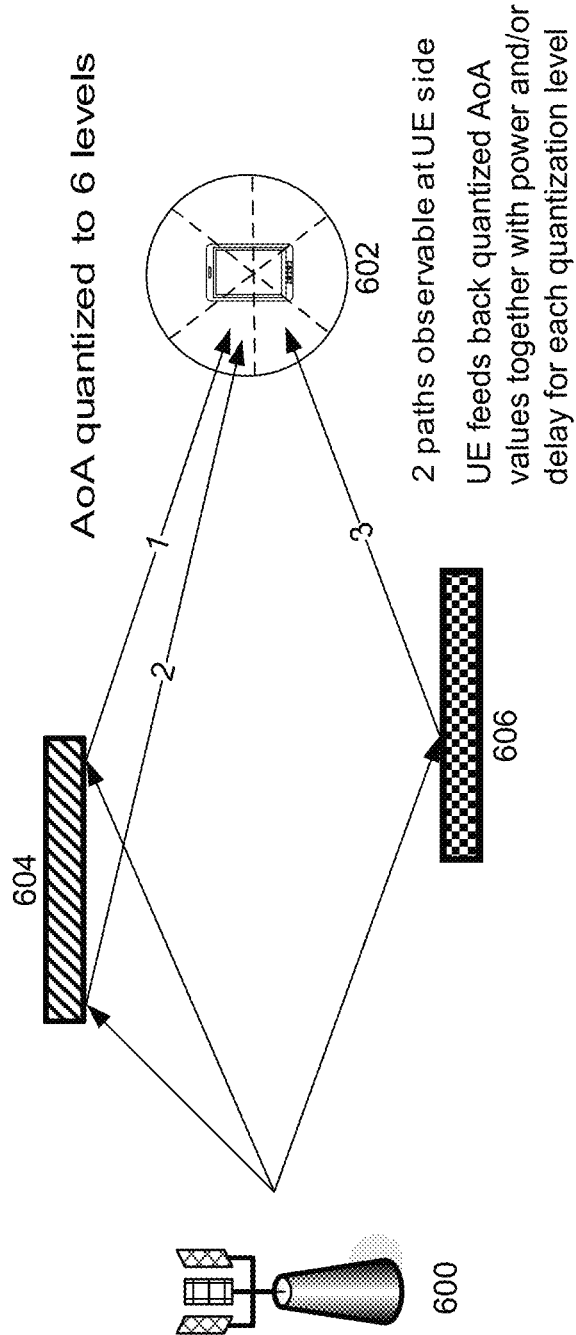
FIG. 6 is a block diagram illustrating dominant channel paths quantized into levels, in accordance with aspects of the present disclosure.

FIG. 6 is a block diagram illustrating dominant channel paths quantized into levels, in accordance with aspects of the present disclosure. As seen in FIG. 6, a base station 600 transmits a signal through a channel having three dominant channel paths (1, 2, 3) to a UE 602. The first path 1 and second path 2 reflect off a first barrier 604 and arrive at the UE 602 in a first sector. That is, in the example of FIG. 6, the UE 602 defines six sectors (or levels) in a two-dimensional plane, based on the UE capability in terms of angular resolution. The sectors are divided with dashed lines in FIG. 6. The third path 3 reflects off a second barrier 606 and arrives at the UE 602 in a different sector than the first and second paths 1, 2.

In the example of FIG. 6, after quantizing the angles of arrival for the paths 1, 2, 3, the UE 602 observes two channel paths within two quantization levels (e.g., sectors). More specifically, the first two channel paths 1, 2, are quantized into a first sector corresponding to a first observed channel path, and the third channel path 3 is quantized into a second sector corresponding to a second observed channel path. If finer angular resolution is available, the UE may differentiate path 1 from path 2, resulting in a different angle of arrival report than discussed with respect to the example of FIG. 6.

According to aspects of the present disclosure, the UE 602 feeds back a power level and/or delay for each of the two quantization levels (e.g., sectors). For example, the first sector receives two channel paths and may have a higher power level than the second sector, which receives a single channel path. Thus, the UE 602 reports to the base station

600 the higher power level for the first sector and reports the lower power level for the second sector. The reporting may include an index of the sector, for example, a three-bit index if six sectors are present, along with the power level and/or delay. An advantage of the index representing the quantization levels is the smaller payload size. Because of the small amount of overhead, the UE feedback may be sent through a medium access control-control element (MAC-CE) or physical uplink control channel (PUCCH).

Although not shown in FIG. 6, elevation may be considered in addition to azimuth. Thus, a sphere may be divided into three-dimensional (3D) quantization levels where quantizing occurs jointly over azimuth and elevation angles. In some configurations, eight levels are present, that is, the sphere may be divided into eight equal volumes.

According to aspects of the present disclosure, machine learning may be employed to report the angle of arrival. For example, a neural network may be trained to output quantized per-path angle of arrival values instead of finer per-path angle of arrival estimates, such as a precise number of degrees in azimuth and a precise number of degrees in elevation. The neural network trained to output quantized per-path angle of arrival values may be less complex than a neural network attempting to estimate finer per-path angle of arrival values. In this aspect, an output layer of the neural network may generate a quantized angle of arrival (for example, one of eight quantized levels), as well as power and/or delay estimates. The output may be based on a function of the received signal, for example, baseband IQ samples.

The input of the neural network may be received signals at the UE. In one aspect, the signals may be observed at the antenna elements. For example, the signals may be observed when digital beamforming occurs. In other aspects, the signals may be observed from baseband signals in the RF chain, such as when performing hybrid beamforming in which a number of RF chains is less than a number of antenna elements or access to all antenna elements is not available. Where the inputs are measured may be based upon which frequency is used for communications, such as FR2 (frequency range two–mmWave) vs. FR6 (frequency range six). In other aspects, a neural network may be trained to predict quantized per-path angle of arrival for FR2 based on measurements at FR1.

According to aspects of the present disclosure, a quantization format is established between the UE and the base station. The base station may query the UE capability in terms of angular resolution and determine a quantization format accordingly. For example, when the angle of arrival is quantized to L levels, each per-path angle of arrival may be represented by $\log_2 L$ bits, hence lower overhead. If eight regions are determined to be appropriate based on the UE capability, the base station instructs the UE to use three bits, with one value mapped to each quantization level.

In one example, six quantization levels are available: 0-60 degrees corresponds to 000; 60-120 degrees corresponds to 001; 120-180 degrees corresponds to 010; 180-240 degrees corresponds to 011; 240-300 degrees corresponds to 100; and 300-360 degrees corresponds to 101. The angles are with respect to a global coordinate system. The UE observes the azimuth angle of arrival and/or zenith angle of arrival with respect to its antenna panels and converts the information to the global coordinate system based on the UE's orientation information. This is an exemplary format that may be agreed upon between a UE and a base station for quantized angle of arrival indication. With this example format, the UE may feedback 001 and 010 to the base station in one scenario.

As noted above, the quantization may be over both azimuth and elevation angles (jointly). In this case, a 3D representation, such as a sphere, may be used.

In another aspect of the present disclosure, the UE may report a given angle of arrival sector only if the corresponding path power is larger than a threshold. For example, three of the quantization levels may have a power level above a threshold, and five of the quantization levels may have negligible power, in which case the UE only reports the three observed channels with considerable power. The threshold power level may be configured by a base station. The quantized angle of arrival feedback report may be configured to be periodic, semi-persistent, or aperiodic.

In other aspects, the report may be sent on-demand in response to a base station request. For example, the base station may request an angle of arrival report. The request may include the threshold power level described above, which provides a condition for transmitting a report. In response to the request, the UE calculates power levels for each quantization level and reports back on each quantization level (e.g., sector) having a power level exceeding the threshold. For example, the UE may report sector three as 44 dBm and sector four as 41 dBm. In some aspects of the present disclosure, the UE measures sectors that have recently received dominant channel paths more frequently than sectors that have not recently received dominant channel paths.

As indicated above, FIG. 6 is provided as an example. Other examples may differ from what is described with respect to FIG. 6.

Figure 7:
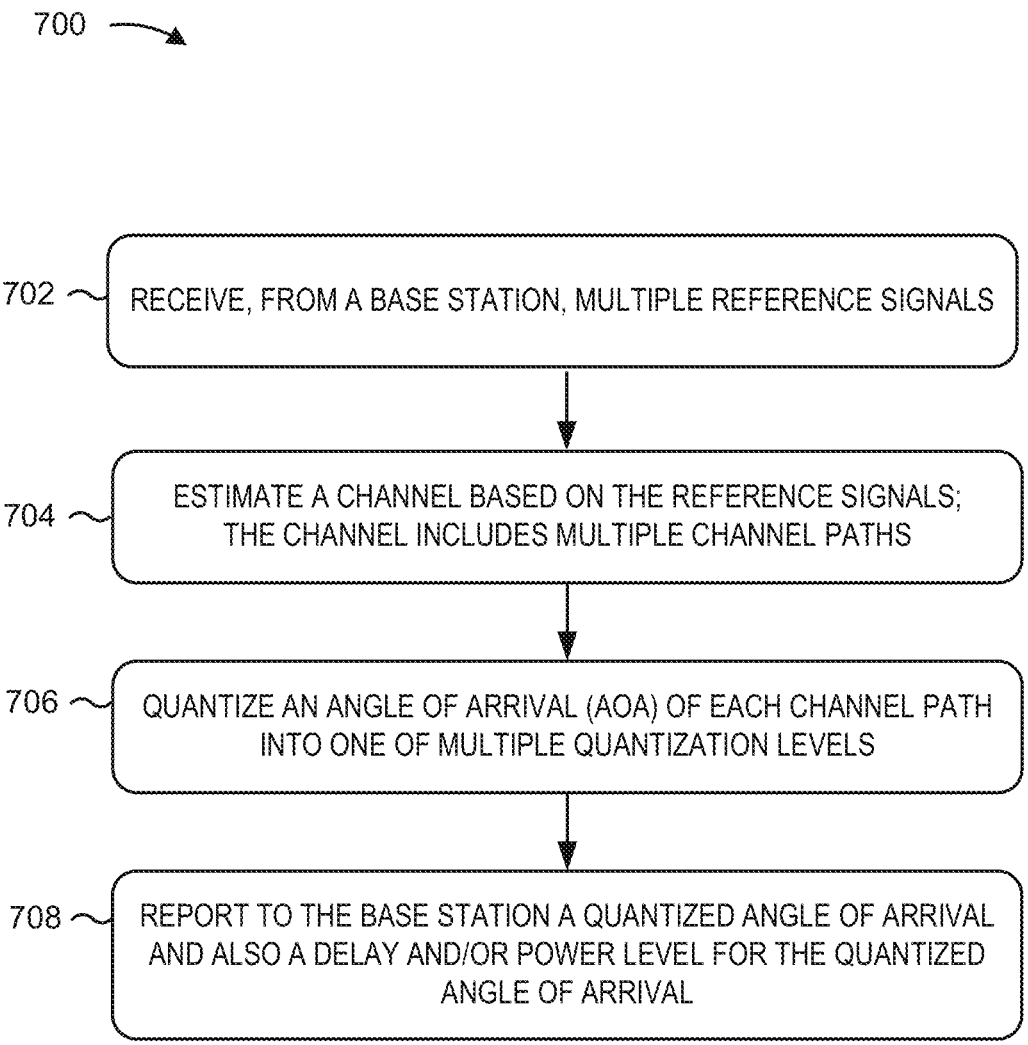
FIG. 7 is a diagram illustrating an example process performed, for example, by a user equipment (UE), in accordance with various aspects of the present disclosure.

FIG. 7 is a diagram illustrating an example process 700 performed, for example, by a user equipment (UE), in accordance with various aspects of the present disclosure. The example process 700 is an example of UE feedback of quantized per-path angle of arrival. As shown in FIG. 7, in some aspects, the process 700 may include receiving, from a base station, multiple reference signals. (block 702). For example, the UE (e.g., using the antenna 252*a*, DEMOD/MOD 254*a*, MIMO detector 256, receive processor 258, controller/processor 280, and/or memory 282) may receive the reference signals. The process 700 may include estimating a channel based on the reference signals. Multiple channel paths are included in the channel (block 704). For example, the UE (e.g., using the controller/processor 280, and/or memory 282) may receive the reference signals.

As shown in FIG. 7, in some aspects, the process 700 may include quantizing an angle of arrival (AoA) of each channel path into one of multiple quantization levels (block 706). For example, the UE (e.g., using the controller/processor 280, and/or memory 282) may quantize an angle of arrival (AoA) with neural network processing. The quantity of quantization levels may be based on a quantity of antenna elements at the UE. The quantization levels may be three-dimensional quantization levels such that the quantizing occurs jointly over an azimuth angle of arrival and an elevation angle of arrival.

In some aspects, the process 700 may include reporting to the base station a quantized angle of arrival and also a delay and/or power level for the quantized angle of arrival (block 708). For example, the UE (for example, using the antenna 252*r*, DEMOD/MOD 254*r*, TX MIMO processor 266, transmit processor 264, controller/processor 280, and/or memory 282) may report to the base station. The reporting may be via a physical uplink control channel (PUCCH) or via a media access control-control element (MAC-CE). The reporting may be per quantization level, and may be periodic, aperiodic, or semi-persistent. In some aspects the reporting is responsive to a base station request.

Implementation examples are described in the following numbered clauses.

1. A method of wireless communication by a user equipment (UE), comprising:
   receiving, from a base station, a plurality of reference signals;
   estimating a channel based on the plurality of reference signals, the channel comprising a plurality of channel paths;
   quantizing an angle of arrival (AoA) of each of the plurality of channel path into one of a plurality of quantization levels; and
   reporting to the base station a quantized angle of arrival, and at least one of a delay or a power level for the quantized angle of arrival.

2. The method of clause 1, in which a quantity of the plurality of quantization levels is based on a quantity of antenna elements at the UE.

3. The method of clause 1 or 2, in which the quantizing occurs with a neural network, the neural network outputting the quantized angle of arrival based on a function of a received signal input to the neural network.

4. The method of any of the preceding clauses, in which the reporting is via a physical uplink control channel (PUCCH) or via a media access control-control element (MAC-CE).

5. The method of any of the preceding clauses, further comprising:
   transmitting a UE capability for angular resolution;
   receiving a quantization format based on transmitting the UE capability; and
   reporting the quantized angle of arrival, and the at least one of the delay or the power level to the base station based on the quantization format.

6. The method of any of the preceding clauses, in which the plurality of quantization levels are three-dimensional quantization levels and the quantizing occurs jointly over an azimuth angle of arrival and an elevation angle of arrival.

7. The method of any of the preceding clauses, further comprising reporting the quantized angle of arrival, and the at least one of the delay or the power level for a quantization level in response to the power level of the quantization level exceeding a threshold.

8. The method of any of the preceding clauses, further comprising receiving, from the base station, a configuration for the threshold.

9. The method of any of the preceding clauses, in which the reporting is periodic, semi-persistent, or aperiodic.

10. The method of any of clauses 1-8, in which the reporting occurs in response to a base station request.

11. The method of any of the preceding clauses, in which the power level comprises a combined received power level of channels within the quantization level.

12. An apparatus for wireless communications at a user equipment (UE), comprising:
   at least one processor,
   memory coupled with the at least one processor; and
   instructions stored in the memory and operable, when executed by the at least one processor, to cause the apparatus:
      to receive, from a base station, a plurality of reference signals;
      to estimate a channel based on the plurality of reference signals, the channel comprising a plurality of channel paths;
      to quantize an angle of arrival (AoA) of each of the plurality of channel paths into one of a plurality of quantization levels; and
      to report to the base station a quantized angle of arrival, and at least one of a delay and/or a power level for the quantized angle of arrival.

13. The apparatus of clause 12, in which a quantity of the plurality of quantization levels is based on a quantity of antenna elements of the UE.

14. The apparatus of clause 12 or 13, in which the at least one processor causes the apparatus to quantize with a neural network, the neural network outputting the quantized angle of arrival based on a function of a received signal, input to the neural network.

15. The apparatus of any of the clauses 12-14, in which the at least one processor causes the apparatus to report via a physical uplink control channel (PUCCH) or via a media access control-control element (MAC-CE).

16. The apparatus of any of the clauses 12-15, in which the at least one processor causes the apparatus:
   to transmit a UE capability for angular resolution;
   to receive a quantization format based on transmitting the UE capability; and
   to report the quantized angle of arrival and the at least one of the delay or the power level to the base station based on the quantization format.

17. The apparatus of any of the clauses 12-16, in which the plurality of quantization levels are three-dimensional quantization levels and the at least one processor causes the apparatus to quantize jointly over an azimuth angle of arrival and an elevation angle of arrival.

18. The apparatus of any of the clauses 12-17, in which the at least one processor causes the apparatus to report the quantized angle of arrival and the at least one of the delay or the power level for a quantization level in response to the power level of the quantization level exceeding a threshold.

19. The apparatus of any of the clauses 12-18, in which the at least one processor causes the apparatus to receive a configuration for the threshold from the base station.

20. The apparatus of any of the clauses 12-19, in which the at least one processor causes the apparatus to report periodically, semi-persistently, or aperiodically.

21. The apparatus of any of the clauses 12-18, in which the at least one processor causes the apparatus to report in response to a base station request.

22. The apparatus of any of the clauses 12-21, in which the power level comprises a combined received power level of signals within the quantization level.

23. An apparatus of a user equipment (UE) for wireless communications, comprising:
   means for receiving, from a base station, a plurality of reference signals;
   means for estimating a channel based on the plurality of reference signals, the channel comprising a plurality of channel paths;
   means for quantizing an angle of arrival (AoA) of each of the plurality of channel paths into one of a plurality of quantization levels; and
   means for reporting to the base station a quantized angle of arrival, and at least one of a delay or a power level for the quantized angle of arrival.

24. The apparatus of clause 23, in which a quantity of the plurality of quantization levels is based on a quantity of antenna elements of the UE.

25. The apparatus of clause 23 or 24, in which the means for quantizing resides within a neural network, the neural network outputting the quantized angle of arrival based on a function of a received signal, input to the neural network.

26. The apparatus of any of the clauses 23-25, in which the means for reporting comprises means for reporting via a physical uplink control channel (PUCCH) or via a media access control-control element (MAC-CE).

27. The apparatus of any of the clauses 23-26, further comprising:
means for transmitting a UE capability for angular resolution;
means for receiving a quantization format based on transmitting the UE capability; and
means for reporting the quantized angle of arrival and the at least one of the delay or the power level to the base station based on the quantization format.

28. The apparatus of any of the clauses 23-27, in which the plurality of quantization levels are three-dimensional quantization levels and the means for quantizing includes means for quantizing jointly over an azimuth angle of arrival and an elevation angle of arrival.

29. The apparatus of any of the clauses 23-28, further comprising means for reporting the quantized angle of arrival and the at least one of the delay or the power level for a quantization level in response to the power level of the quantization level exceeding a threshold.

30. The apparatus of any of the clauses 23-29, further comprising means for receiving a configuration for the threshold from the base station.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
estimating a channel in accordance with a plurality of reference signals received from a base station, the channel comprising a plurality of channel paths;
quantizing an angle of arrival (AoA) of each of the plurality of channel paths into one of a plurality of AoA quantization levels; and
reporting to the base station a quantized angle of arrival, and at least one of a delay or a power level for the quantized angle of arrival.

2. The method of claim 1, wherein a quantity of the plurality of AoA quantization levels is associated with a quantity of antenna elements at the UE.

3. The method of claim 1, wherein the quantizing occurs with a neural network, the neural network outputting the quantized angle of arrival in accordance with a function of a received signal input to the neural network.

4. The method of claim 1, wherein the reporting is via a physical uplink control channel (PUCCH) or via a media access control-control element (MAC-CE).

5. The method of claim 1, further comprising:
transmitting a UE capability for angular resolution;
receiving a quantization format associated with transmitting the UE capability; and
reporting the quantized angle of arrival, and the at least one of the delay or the power level to the base station associated with the quantization format.

6. The method of claim 1, wherein the plurality of AoA quantization levels are three-dimensional quantization levels and the quantizing occurs jointly over an azimuth angle of arrival and an elevation angle of arrival.

7. The method of claim 1, further comprising reporting the quantized angle of arrival, and the at least one of the delay or the power level for an AoA quantization level in response to the power level of the AoA quantization level exceeding a threshold.

8. The method of claim 7, further comprising receiving, from the base station, a configuration for the threshold.

9. The method of claim 1, wherein the reporting is periodic, semi-persistent, or aperiodic.

10. The method of claim 1, wherein the reporting occurs in response to a base station request.

11. The method of claim 1, wherein the power level comprises a combined received power level of channels within the one AoA quantization level.

12. An apparatus for wireless communications at a user equipment (UE), comprising:
at least one processor, memory coupled with the at least one processor; and
instructions stored in the memory and
operable, when executed by the at least one processor, to cause the
apparatus to:
    estimate a channel in accordance with a plurality of reference signals received from a base station, the channel comprising a plurality of channel paths;
    quantize an angle of arrival (AoA) of each of the plurality of channel paths into one of a plurality of quantization levels; and
    report to the base station a quantized angle of arrival, and at least one of a delay or a power level for the quantized angle of arrival.

13. The apparatus of claim 12, wherein a quantity of the plurality of AoA quantization levels is associated with a quantity of antenna elements of the UE.

14. The apparatus of claim 12, wherein the at least one processor causes the apparatus to quantize with a neural network, the neural network outputting the quantized angle of arrival in accordance with a function of a received signal, input to the neural network.

15. The apparatus of claim 12, wherein the at least one processor causes the apparatus to report via a physical uplink control channel (PUCCH) or via a media access control-control element (MAC-CE).

16. The apparatus of claim 12, wherein the at least one processor causes the apparatus to:
    transmit a UE capability for angular resolution;
    receive a quantization format associated with transmitting the UE capability; and
    report the quantized angle of arrival and the at least one of the delay or the power level to the base station associated with the quantization format.

17. The apparatus of claim 12, wherein the plurality of AoA quantization levels are three-dimensional quantization levels and the at least one processor causes the apparatus to quantize jointly over an azimuth angle of arrival and an elevation angle of arrival.

18. The apparatus of claim 12, wherein the at least one processor causes the apparatus to report the quantized angle of arrival and the at least one of the delay or the power level for an AoA quantization level in response to the power level of the AoA quantization level exceeding a threshold.

19. The apparatus of claim 18, wherein the at least one processor causes the apparatus to receive a configuration for the threshold from the base station.

20. The apparatus of claim 12, wherein the at least one processor causes the apparatus to report periodically, semi-persistently, or aperiodically.

21. The apparatus of claim 12, wherein the at least one processor causes the apparatus to report in response to a base station request.

22. The apparatus of claim 12, wherein the power level comprises a combined received power level of signals within the one AoA quantization level.

23. An apparatus of a user equipment (UE) for wireless communications, comprising:
    means for estimating a channel in accordance with a plurality of reference signals received from a base station, the channel comprising a plurality of channel paths;
    means for quantizing an angle of arrival (AoA) of each of the plurality of channel paths into one of a plurality of AoA quantization levels; and
    means for reporting to the base station a quantized angle of arrival, and at least one of a delay or a power level for the quantized angle of arrival.

24. The apparatus of claim 23, wherein a quantity of the plurality of AoA quantization levels is associated with a quantity of antenna elements of the UE.

25. The apparatus of claim 23, wherein the means for quantizing resides within a neural network, the neural network outputting the quantized angle of arrival in accordance with a function of a received signal, input to the neural network.

26. The apparatus of claim 23, wherein the means for reporting comprises means for reporting via a physical uplink control channel (PUCCH) or via a media access control-control element (MAC-CE).

27. The apparatus of claim 23, further comprising:
    means for transmitting a UE capability for angular resolution;
    means for receiving a quantization format associated with transmitting the UE capability; and
    means for reporting the quantized angle of arrival and the at least one of the delay or the power level to the base station associated with the quantization format.

28. The apparatus of claim 23, wherein the plurality of AoA quantization levels are three-dimensional quantization levels and the means for quantizing includes means for quantizing jointly over an azimuth angle of arrival and an elevation angle of arrival.

29. The apparatus of claim 23, further comprising means for reporting the quantized angle of arrival and the at least one of the delay or the power level for an AoA quantization level in response to the power level of the AoA quantization level exceeding a threshold.

30. The apparatus of claim 29, further comprising means for receiving a configuration for the threshold from the base station.

* * * * *